(12) United States Patent
Guthrie et al.

(10) Patent No.: US 7,500,065 B2
(45) Date of Patent: *Mar. 3, 2009

(54) DATA PROCESSING SYSTEM AND METHOD FOR EFFICIENT L3 CACHE DIRECTORY MANAGEMENT

(75) Inventors: Guy Lynn Guthrie, Austin, TX (US); William John Starke, Round Rock, TX (US); Derek Edward Williams, Austin, TX (US); Philip G. Williams, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/956,102

(22) Filed: Dec. 13, 2007

(65) Prior Publication Data

US 2008/0091885 A1 Apr. 17, 2008

Related U.S. Application Data

(63) Continuation of application No. 11/055,301, filed on Feb. 10, 2005, now Pat. No. 7,337,280.

(51) Int. Cl.
*G06F 12/00* (2006.01)

(52) U.S. Cl. .................. 711/141; 711/119; 711/122; 711/144; 711/156

(58) Field of Classification Search ............. None
See application file for complete search history.

(56) References Cited

U.S. PATENT DOCUMENTS 7,337,280 B2 * 2/2008 Guthrie et al. ............. 711/141

\* cited by examiner

*Primary Examiner*—Reginald G Bragdon
*Assistant Examiner*—Shawn X Guy
(74) *Attorney, Agent, or Firm*—Diana R. Gerhardt; Dillon & Yudell LLP

(57) ABSTRACT

A system and method for cache management in a data processing system having a memory hierarchy of upper memory and lower memory cache. A lower memory cache controller accesses a coherency state table to determine replacement policies of coherency states for cache lines present in the lower memory cache when receiving a cast-in request from one of the upper memory caches. The coherency state table implements a replacement policy that retains the more valuable cache coherency state information between the upper and lower memory caches for a particular cache line contained in both levels of memory at the time of cast-out from the upper memory cache.

8 Claims, 6 Drawing Sheets

DATA PROCESSING SYSTEM AND METHOD FOR EFFICIENT L3 CACHE DIRECTORY MANAGEMENT

CROSS-REFERENCE TO RELATED APPLICATIONS

The present application is a continuation of U.S. patent application Ser. No. 11/055,301 filed Feb. 10, 2005 now issued as U.S. Pat. No. 7,337,280, which is also related to U.S. patent application Ser. No. 11/055,483, which is assigned to the assignee of the present invention and incorporated herein by reference in its entirety.

BACKGROUND OF THE INVENTION

1. Technical Field

The present invention relates in general to data processing systems, and more particularly to an improved multi-processor data processing system. Still more particularly, the present invention relates to improved management of a hierarchical cache system within a multi-processor data processing system.

2. Description of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Because multiple processor cores may request write access to a same cache line of data and because modified cache lines are not immediately synchronized with system memory, the cache hierarchies of multiprocessor computer systems typically implement a cache coherency protocol to ensure at least a minimum level of coherence among the various processor core's "views" of the contents of system memory. In particular, cache coherency requires, at a minimum, that after a processing unit accesses a copy of a memory block and subsequently accesses an updated copy of the memory block, the processing unit cannot again access the old copy of the memory block.

A cache coherency protocol typically defines a set of cache states stored in association with the cache lines stored at each level of the cache hierarchy, as well as a set of coherency messages utilized to communicate the cache state information between cache hierarchies. In a typical implementation, the cache state information takes the form of the well-known MESI (Modified, Exclusive, Shared, Invalid) protocol or a variant thereof, and the coherency messages indicate a protocol-defined coherency state transition in the cache hierarchy of the requester and/or the recipients of a memory access request. The MESI protocol allows a cache line of data to be tagged with one of four states: "M" (modified), "E" (exclusive), "S" (shared), or "I" (invalid). The Modified state indicates that a coherency granule is valid only in the cache storing the modified coherency granule and that the value of the modified coherency granule has not been written to system memory. When a coherency granule is indicated as Exclusive, then, of all caches at that level of the memory hierarchy, only that cache holds the coherency. The data in the Exclusive state is consistent with system memory, however. If a coherency granule is marked as Shared in a cache directory, the coherency granule is resident in the associated cache and in at least one other cache at the same level of the memory hierarchy, and all of the copies of the coherency granule are consistent with system memory. Finally, the Invalid state indicates that the data and address tag associated with a coherency granule are both invalid.

The state to which each coherency granule (e.g., cache line or sector) is set is dependent upon both a previous state of the data within the cache line and the type of memory access request received from a requesting device (e.g., the processor). Accordingly, maintaining memory coherency in the system requires that the processors communicate messages across the system bus indicating their intention to read or write to memory locations. For example, when a processor desires to write data to a memory location, the processor must first inform all other processing elements of its intention to write data to the memory location and receive permission from all other processing elements to carry out the write operation. The permission messages received by the requesting processor indicate that all other cached copies of the contents of the memory location have been invalidated, thereby guaranteeing that the other processors will not access their stale local data.

In some systems, the cache hierarchy includes at least two levels. The level one (L1), or an upper-level cache is usually a private cache associated with a particular processor core in an MP system. The processor core first looks for a data in the upper-level (L1) cache. If the requested data is not found in the upper-level cache, the processor core then access lower-level caches (e.g., level two (L2) or level three (L3) caches) for the requested data. The lowest level cache (e.g., L3) is often shared among several processor cores (L2 cache being an upper-level cache relative to L3 cache).

Typically, when a congruence class of one of an upper-level cache becomes full, data lines are "evicted" or written to a lower-level cache or out to system memory for storage. However, in any memory hierarchy, there may be several copies of the same data residing in the memory hierarchy at the same time. The policy of evicting lines to provide for more space in the upper-level cache results in writes to lower-level caches, including updating coherency state information in the lower-level cache directory.

Heretofore, cache coherency protocols have generally assumed that to maintain cache coherency, coherency states from upper-level cache is copied into lower-level cache. The present invention recognizes significant performance enhancements to the data processing system can be achieved by intelligently defining the protocols for coherency state transition in the cache hierarchy.

SUMMARY OF THE INVENTION

In accordance with the present invention, improved methods, systems and articles of manufacture for cache management in a data processing system having a memory hierarchy including at least an upper memory cache and a lower memory cache are disclosed. One preferred method of the present invention comprises the steps of comparing a first coherency data related to cache data indicated in the lower memory cache to second coherency data related to the cache data indicated in the upper memory cache, determining a coherency state of the cache data in the lower memory cache in response to the comparison of the first coherency data and the second coherency data, and replacing a coherency value associated with the cache data within the lower memory cache with the determined coherency state.

All objects, features, and advantages of the present invention will become apparent in the following detailed written description.

BRIEF DESCRIPTION OF THE DRAWINGS

This invention is described in a preferred embodiment in the following description with reference to the drawings, in which like numbers represent the same or similar elements, as follows.

In the following detailed description of exemplary embodiments of the invention, reference is made to the accompanying drawings, which form a part hereof, and in which is shown by way of illustration specific exemplary embodiments in which the invention may be practiced.

DETAILED DESCRIPTION OF PREFERRED EMBODIMENTS

Figure 1:
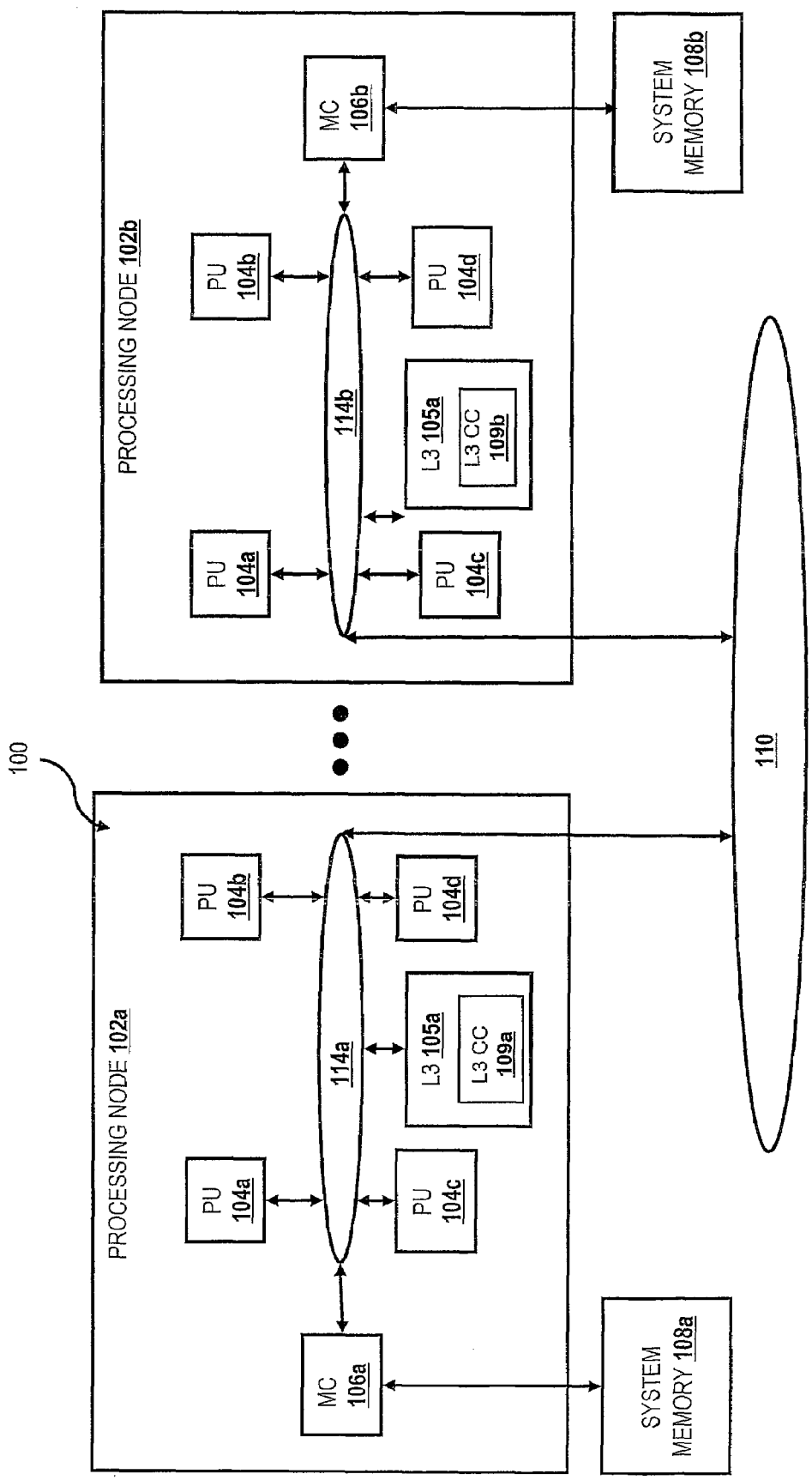
FIG. 1 illustrates a high level block diagram of an exemplary embodiment of a cache coherent symmetric multiprocessor (SMP) data processing system in accordance with the present invention.

With reference now to the figures and, in particular, with reference to FIG. 1, there is illustrated a high level block diagram of an exemplary embodiment of a cache coherent symmetric multiprocessor (SMP) data processing system in accordance with the present invention. As shown, data processing system 100 includes multiple processing nodes 102a, 102b for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches.

The devices attached to each local interconnect 114 include not only processing units 104, but also one or more memory controllers 106, each providing an interface to a respective system memory 108. Data and instructions residing in system memories 108 can generally be accessed and modified by a processor core in any processing unit 104 in any processing node 102 of data processing system 100. In alternative embodiments of the invention, one or more memory controllers 106 (and system memories 108) can be coupled to system interconnect 110 rather than a local interconnect 114, or alternatively, integrated within another device such as a processing unit 104.

Lookaside L3 caches 105 are preferably coupled to processing unit 104 on local interconnect 114. Because of the lower latencies of cache memories as compared with memories 108, L3 caches 105 are utilized by processing units 102 as "cast-out" storage facilities for recently victimized cache lines at higher level caches. Cache Controller (CC) 109 initiates transactions on local interconnect 114 and system interconnect 110 and accesses L3 array and directory in response to memory access (and other) requests received from the associated processor cores 200. Cache Controller (CC) 109 also snoops operations on local interconnect 114, provides appropriate responses, and performs any accesses to L3 array and directory required by the operations.

Those skilled in the art will appreciate that SMP data processing system 100 can include many additional unillustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to cache coherent data processing systems of diverse architectures and are in no way limited to the generalized data processing system architecture illustrated in FIG. 1.

Figure 2:
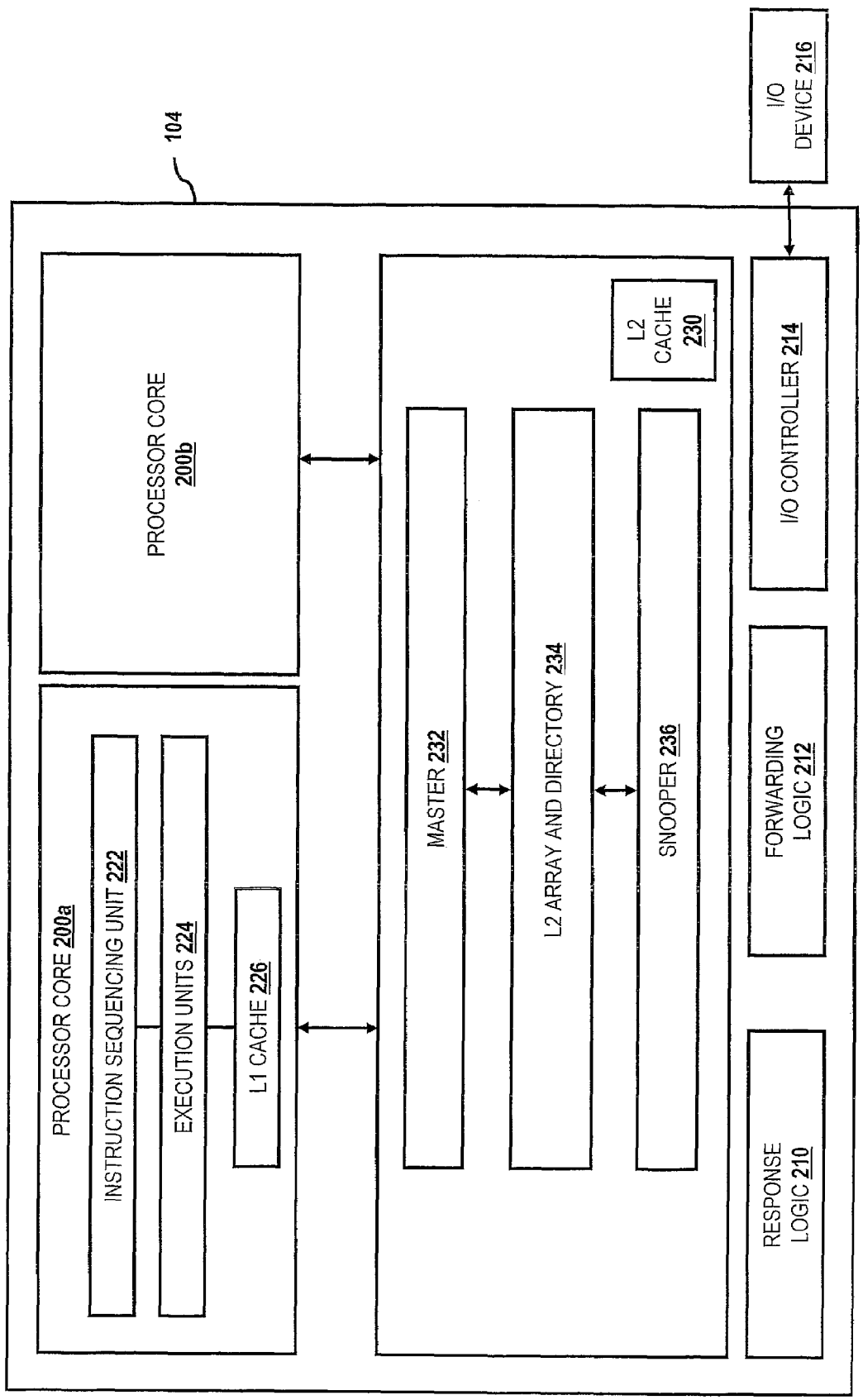
FIG. 2 is a block diagram of a detailed block diagram of an exemplary processing unit, in accordance with the preferred embodiment of the present invention.

Referring now to FIG. 2, there is depicted a more detailed block diagram of an exemplary processing unit 104 in accordance with the present invention. In the depicted embodiment, each processing unit 104 includes two processor cores 200a, 200b for independently processing instructions and data. Each processor core 200 includes at least an instruction sequencing unit (ISU) 222 for fetching and ordering instructions for execution and one or more execution units 224 for executing instructions. The instructions executed by execution units 224 include instructions that request access to a memory block or cause the generation of a request for access to a memory block.

The operation of each processor core 200 is supported by a multi-level volatile memory hierarchy having at its lowest level shared system memories 108, and at its upper levels one or more levels of cache memory, which in the illustrative embodiment include a store-through level one (L1) cache 226 within each processor core 200, a level two (L2) cache 230 shared by all processor cores 200a, 200b of the processing unit 104, and a lookaside level three (L3) cache 105 shared by all processing units 104. L2 cache 230 includes an L2 array and directory 234, a master 109, 232 and a snooper 236. L3 cache 105 similarly includes an L3 array and directory, a master and a snooper (represented collectively as L3 cache controller 109 in FIG. 1). As described herein below, the L2 and L3 array and directory, a master and a snooper are similar in operation and configuration. The descriptions below refer equally to either level of memory unless expressly distinguished. Master 109, 232 initiates transactions on local interconnect 114 and system interconnect 110 and accesses L2 array and directory 234 in response to memory access (and other) requests received from the associated processor cores 200. Snooper 236 snoops operations on local interconnect 114, provides appropriate responses, and performs any accesses to L2 array and directory 234 required by the operations. Although the illustrated cache hierarchy includes only three levels of cache, those skilled in the art will appreciate that alternative embodiments may include additional levels (L4, L5, etc.) of on-chip or off-chip in-line or lookaside cache, which may be fully inclusive, partially inclusive, or non-inclusive of the contents the upper levels of cache.

Each processing unit 104 further includes an instance of response logic 210 implements a portion of the distributed coherency signaling mechanism that maintains cache coherency within data processing system 100. In addition, each processing unit 104 includes an instance of forwarding logic 212 for selectively forwarding communications between its local interconnect 114 and system interconnect 110. Finally, each processing unit 104 includes an integrated I/O (input/output) controller 214 supporting the attachment of one or more I/O devices, such as I/O device 216. An I/O controller 214 may issue read and write operations on its local interconnect 114 and system interconnect 110, for example, in response to requests by its attached I/O device(s) 216.

Figure 3:
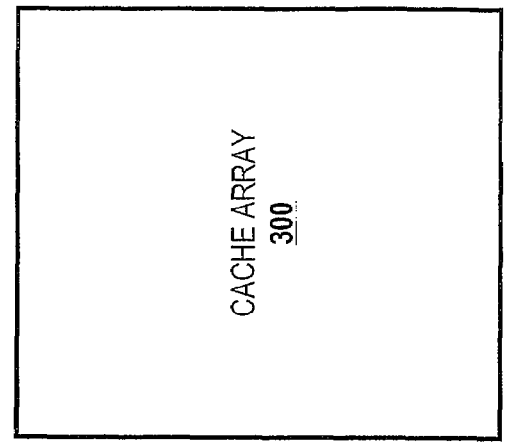
FIG. 3 is a block diagram of an exemplary embodiment of L2/L3 array and directory, in accordance with a preferred embodiment of the present invention.
Figure 3:
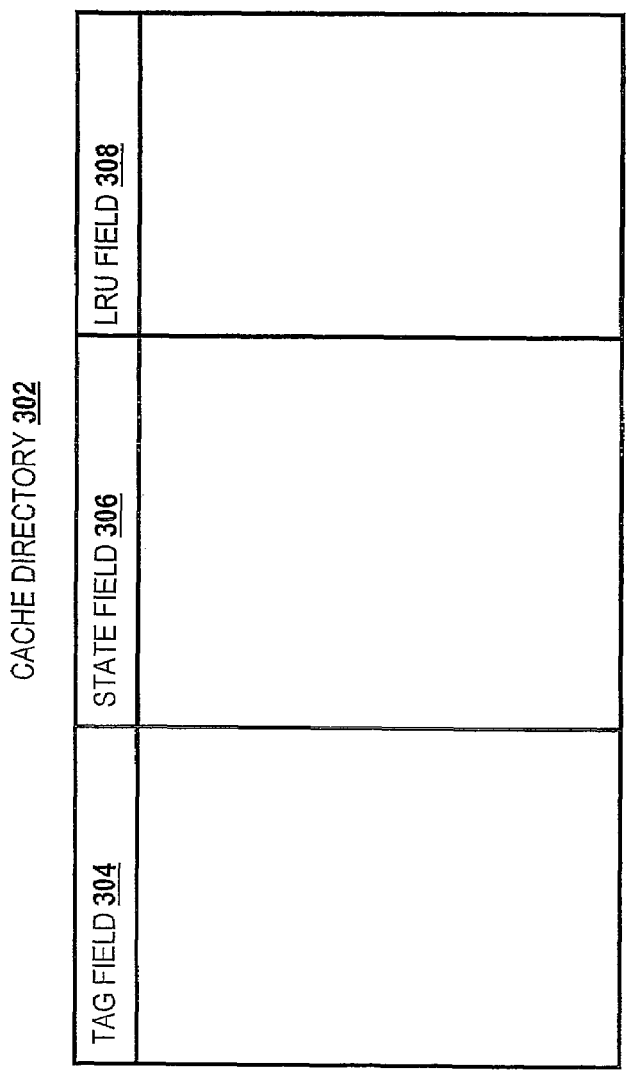

With reference now to FIG. 3, there is illustrated a block diagram of an exemplary embodiment of L2/L3 array and directory, in accordance with a preferred embodiment of the present invention. As illustrated, array and directory 300, 302 includes a set associative cache array 300 and a cache directory 302 identifying the contents of cache array 300. As in conventional set associative caches, memory locations in system memories 108 are mapped to particular congruence classes within cache arrays 300 utilizing predetermined index bits within the system memory (real) addresses. The standard memory block for the coherency system is set at a 128B cache line. The particular cache lines stored within cache array 300 are recorded in cache directory 302, which contains one directory entry for each cache line in cache array 300. As understood by those skilled in the art, each directory entry in cache directory 302 comprises at least a tag field 304, which specifies the particular cache line stored in cache array 300 utilizing a tag portion of the corresponding real address, a state field 306, which indicates the coherency state of the cache line, and a LRU (Least Recently Used) field 308 indicating a replacement order for the cache line with respect to other cache lines in the same congruence class.

Figure 4:
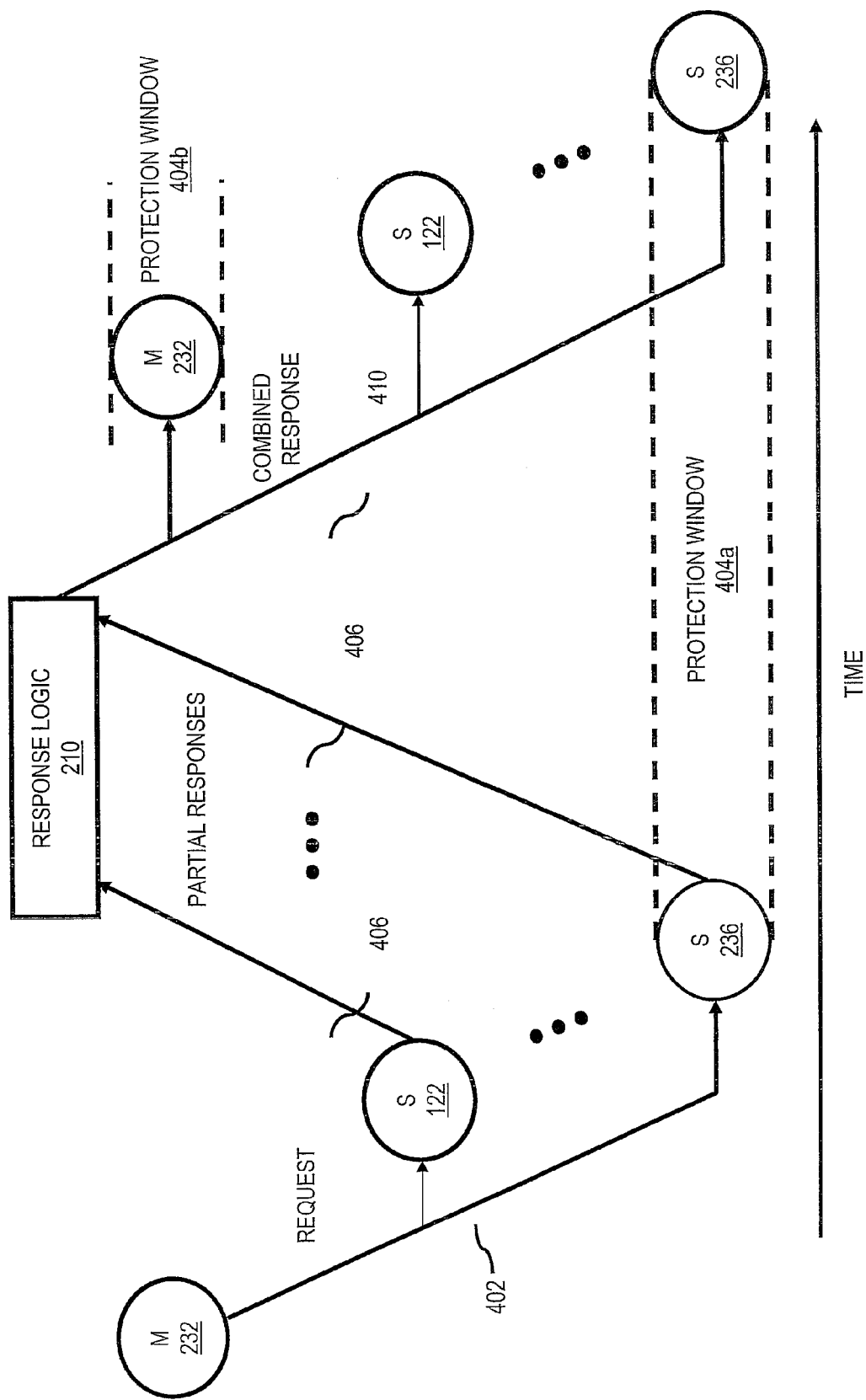
FIG. 4 is a time-space diagram of an exemplary operation on a local or system interconnect of the data processing system, in accordance with a preferred embodiment of the present invention.

Referring now to FIG. 4, there is depicted a time-space diagram of an exemplary operation on a local or system interconnect 110, 114 of data processing system 100 of FIG. 1. The operation begins when a master 109, 232 of an L2 cache 230 (or another master, such as cache controller 109 or an I/O controller 214) issues a request 402 on an interconnect 110, 114. Request 402 preferably includes a transaction type indicating a type of desired access and a resource identifier (e.g., real address) indicating a resource to be accessed by the request. Common types of requests preferably include those set forth below in Table I.

TABLE I

| Request | Description |
| --- | --- |
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique copy of a memory block without regard to its present state and subsequently modify its contents; requires destruction of other copies, if any |
| CASTOUT | Copies the image of a memory block from a higher level of memory to a lower level of memory in preparation for the destruction of the higher level copy. A "CASTIN" is a received CASTOUT from a higher level of memory. |
| WRITE | Requests authority to create a new unique copy of a memory block without regard to its present state and immediately copy the image of the memory block from a higher level memory to a lower level memory in preparation for the destruction of the higher level copy |
| PARTIAL WRITE | Requests authority to create a new unique copy of a partial memory block without regard to its present state and immediately copy the image of the partial memory block from a higher level memory to a lower level memory in preparation for the destruction of the higher level copy |

Request 402 is received by the snooper 236 of L2 caches 230 and the snooper of cache controller 109, as well as the snoopers 122a, 122b of memory controllers 106a, 106b (FIG. 1). In general, with some exceptions, the snooper 236 in the same L2 cache 230 as the master 109, 232 of request 402 does not snoop request 402 (i.e., there is generally no self-snooping) because a request 402 is transmitted on local interconnect 114 and/or system interconnect 110 only if the request 402 cannot be serviced internally by a processing unit 104. In response to request 402, each snooper 109, 122, 236 receiving request 402 provides a respective partial response 406 representing the response of at least that snooper to request 402. A snooper within a memory controller 106 determines the partial response 406 to provide based, for example, whether the snooper is responsible for the request address and whether it has resources available to service the request. A snooper 236 of an L2 cache 230 or cache controller 109 may determine its partial response 406 based on, for example, the availability of its cache directory 302, the availability of a snoop logic instance within snooper to handle the request, and the cache state associated with the request address in cache directory 302.

The partial responses of snoopers 109, 122 and 236 are logically combined either in stages or all at once by one or more instances of response logic 210 to determine a system-wide combined response (CR) 410 to request 402. Response logic 210 provides combined response 410 to master 109, 232 and each snooper 109, 122, 236 via its local interconnect 114 and system interconnect 110 to indicate the system-wide response (e.g., success, failure, retry, etc.) to request 402. If CR 410 indicates success of request 402, CR 410 may indicate, for example, a data source for a requested memory block, a cache state in which the requested memory block is to be cached by master 109, 232, and whether "cleanup" operations invalidating the requested memory block in one or more L2 caches 230 are required.

In response to receipt of combined response 410, one or more of master 109, 232 and snoopers 109, 122, 236 typically perform one or more operations in order to service request 402. These operations may include supplying data to master 109, 232, invalidating or otherwise updating the coherency state of data cached in one or more caches 230, 105 performing castout operations, writing back data to a system memory 108, etc. As discussed further below, if required by request 402, a requested or target memory block may be transmitted to or from master 109, 232 before or after the generation of combined response 410 by response logic 210.

In the following description, partial response of a snooper 122, 236 to a request and the operations performed by the snooper in response to the request and/or its combined response will be described with reference to whether that snooper is a Highest Point of Coherency (HPC), a Lowest Point of Coherency (LPC), or neither with respect to the request address specified by the request. An LPC is defined herein as a memory device or I/O device that serves as the repository for a memory block. In the absence of a HPC for the memory block, the LPC holds the true image of the memory block and has authority to grant or deny requests to generate an additional cached copy of the memory block. For a typical request in the data processing system embodiment of FIGS. 1 and 2, the LPC will be the L3 cache 105 or the memory controller 106 for the system memory 108 holding the referenced memory block. An HPC is defined herein as a device that caches a true image of the memory block (which may or may not be consistent with the corresponding memory block at the LPC) and has the authority to grant or deny a request to generate an additional cached copy of the memory block. Thus, for a typical request in the data processing system embodiment of FIGS. 1 and 2, the HPC, if any, within a given processing node 102 (also referred to as a "coherency domain" herein) will be either the L2 cache 230 of a given processing unit 104 or the L3 cache 105.

Although other indicators may be utilized to designate an HPC for a memory block, a preferred embodiment of the present invention designates the HPC, if any, for a memory block utilizing selected cache coherency state(s) within the L2 cache directory 302 of an L2 cache 230 or the L3 cache directory 302 of an L3 cache 105. In this preferred embodiment, the set of cache coherency states, in addition to providing (1) an indication of whether the cache is the HPC for a memory block, also indicate (2) whether the cached copy is unique (i.e., is the only cached copy) among caches at that memory hierarchy level, (3) whether and when the cache can provide a copy of the memory block to a master of a request, and (4) whether the cached image of the memory block is consistent with the corresponding memory block in the LPC. These four attributes can be expressed, for example, in a variant of the well-known MESI (Modified, Exclusive, Shared, Invalid) protocol summarized below in Table II.

TABLE II

| | NAME | DEFINITION | ENTERED WHEN: |
|---|---|---|---|
| I | The invalid state. | The data and tag info is invalid in the L2. This is the initial state of the L2. | Power-On-Reset. Snoop invalidate from remote(domain) device (rwitm, dclaim, dcbz, dma_wr). |
| Ig | The invalid global state. | The data is invalid but the tag info is valid in the L2. This state is a precise indication that this L2/L3 cache performed modified intervention to an L2 outside this domain. This state tracks the fact the line left this domain and is responsible for indicating to memory that the memory-domain bit needs to be set to 'global'. | L2/L3 performs modified intervention to a master outside the domain. |
| In | The invalid Node state. | The data is invalid but the tag info is valid in the L2/L3. This state is an imprecise indication that the L2/L3 cache either: performed modified intervention to an L2/L3 inside this domain; or detected a store-type op by a master inside the domain. This state is a hint that the line is still in this domain and the RC's next request attempt for this line should be local. | L2/L3 performs modified entervention to a master inside the domain or detected a store-type op from a master inside the domain). |
| S | The shared state. | The data and tag are valid. The cache line may also be valid in other L2/L3caches. In this state, the data cannot be sourced to another off-chip L2/L3 via intervention(it can however supply intervention data). | Snoop read hit (SL) from within local MCM. |
| $S_L$ | The shared state (source to local). | The data and tag are valid. The cache line may also be valid in other L2 caches. From this state, the can be sourced to another L2/L3 (in this MCM only) via intervention. | Core data-load or Instruction-fetch. |
| Tn | The tagged node state. | The data and tag are valid. The data is modified, but was sourced by this cache to another master inside this domain (i.e. was in the M state at sometime in the past, but is not currently exclusively owned). From this state, the data will not be sourced to another L2/L3 via intervention until the combined response is received and it is determined that no other L2/L3 is sourcing | Snoop read hit (M) from master inside the domain. |

TABLE II-continued

| NAME | | DEFINITION | ENTERED WHEN: |
|---|---|---|---|
| | | data (i.e. if no L2/L3's are found to be SL). Castout of a Tn line requires invalidation of the tag, updating memory with data. | |
| Ten | The tagged exclusive node state. | The data and tag are valid. The data has not been modified, but was sourced by this cache to another master inside this domain (i.e. was in the Me state at sometime in the past, and a shared copy was sourced to another cache). From this state, the data will not be sourced to another L2 via intervention until the combined response is received and it is determined that no other L2/L3is sourcing data (i.e. if no L2/L3's are found to be SL). Castout of a Ten line only requires invalidation of the tag. | Snoop read hit (Me) from master inside this domain. |
| T | The tagged state. | The data and tag are valid. The data is modified, but was sourced by this cache to another master outside this domain (i.e. was in the M state at sometime in the past, but is not currently exclusively owned). From this state, the data will not be sourced to another L2 via intervention until the combined response is received and it is determined that no other L2/L3 is sourcing data (i.e. if no L2/L3's are found to be SL). Castout of a T line requires invalidation of the tag, updating memory with data, and indication to the MC that the memory-domain bit should be set to 'global'. | Snoop read hit (M) from master outside the domain. |
| Te | The exclusive tagged state. | The data and tag are valid. The data has not been modified, but was sourced by this cache to another master outside this domain (i.e. was in the Me state at sometime in the past, and a shared copy was sourced to another cache). From this state, the data will not be sourced to another L2 via intervention until the combined response is received and it is determined that no other L2/L3 is sourcing data. Castout of a Te line only requires invalidation of the tag and indication to the MC that the memory-domain bit should be set to 'global' (i.e. data does not have to be castout to memory). | Snoop read hit (Me) from master outside this domain. |
| M | The modified state. | The data and tag are valid. The data has been modified and is exclusively owned. The cache line cannot be valid in any other L2. From this state, the data can be sourced to another L2 (in the local MCM or a remote MCM) via intervention. | Core data store. |
| Me | The modified 'exclusive' state. | The data and tag are valid. The data is not considered modified but is exclusive to this L2. The cache line cannot be valid in any other L2. Castout of an Me line only requires invalidation of the tag(i.e. data does not have to be castout to memory). | LPC sources data and no other caches are Shared. |
| Mu | The 'unsolicited' modified state. | The data and tag are valid. The data is considered to have been modified and is exclusively owned. The cache line cannot be valid in any other L2. | L2 or L3 is M and fabric command type is a Rd(go_Mx) |

In accordance with the present invention, storage of domain indicators in cache memory, such as L2 caches 230, can also be enhanced. In particular, in the embodiment of data processing system 100 described with reference to FIG. 1, domain indicators are received by L2/L3 caches 230 in conjunction with the associated memory blocks and may optionally be stored with the memory blocks in cache arrays 300. While this arrangement permits a simplified data flow for domain indicators, when a first L2 cache 230 responds to a bus RWITM operation of a second L2 cache 230 residing in a different coherency domain by supplying the requested memory block, no "global" indicator remains cached in the local coherency domain. Thus, the LPC must be accessed to determine whether or not the memory block is known to be cached, if at all, only locally. Consequently, if an HPC for a memory block receives a bus RWITM operation from a requester in a remote coherency domain, the system responds with a retry-push including a cache castout of the requested memory block and retry of the bus RWITM operation. As will be appreciated, it would be preferable to eliminate the latency and bandwidth utilization associated with retry-push responses.

To reduce access latency to a domain indication in cases in which no copy of a memory block remains cached in a coherency domain, an additional cache state, referred to herein as Ig (Invalid global), is provided. The Ig state is defined herein as a cache coherency state indicating (1) the associated memory block in the cache array is invalid, (2) the address tag in the cache directory is valid, and (3) a copy of the memory block identified by the address tag may possibly be cached in another coherency domain.

The Ig state is formed in a lower level cache in response to that cache providing a requested memory block to a requester in another coherency domain in response to an exclusive access request (e.g., a bus RWITM or bus DClaim operation). It may be preferable to form the Ig state only in the coherency domain containing the LPC for the memory block. In such embodiments, some mechanism (e.g., a partial response by the LPC and subsequent combined response) must be implemented to indicate to the cache sourcing the requested memory block that the LPC is within its local coherency domain. In other embodiments that do not support the communication of an indication that the LPC is local, an Ig state may be formed any time that a cache sources a memory block to a remote coherency domain in response to an exclusive access request.

Because cache directory entries including an Ig state carry potentially useful information, it is desirable in at least some implementations to preferentially retain entries in the Ig state over entries in the I state (e.g., by modifying the Least Recently Used (LRU) algorithm utilized to evaluate LRU field 308 to select a victim cache entry for replacement). As Ig directory entries are retained in cache, it is possible for some Ig entries to become "stale" over time in that a cache whose exclusive access request caused the formation of the Ig state may deallocate or writeback its copy of the memory block without notification to the cache holding the address tag of the memory block in the Ig state. In such cases, the "stale" Ig state, which incorrectly indicates that a global operation should be issued instead of a local operation, will not cause any coherency errors, but will merely cause some operations, which could otherwise be serviced utilizing a local operation, to be issued as global operations. Occurrences of such inefficiencies will be limited in duration by the eventual replacement of the "stale" Ig cache entries.

Several rules govern the selection and replacement of Ig cache entries. First, if a cache selects an Ig entry as the victim for replacement, a castout of the Ig entry is performed (unlike the case when an I entry is selected). Second, if a request that causes a memory block to be loaded into a cache hits on an Ig cache entry in that same cache, the cache treats the Ig hit as a cache miss and performs a castout operation with an Ig entry as the selected victim. The cache thus avoids placing two copies of the same address tag in the cache directory. Third, the castout of the Ig state is preferably performed as a local operation, or if performed as a global operation, ignored by a remote LPC of the castout address. If an Ig entry is permitted to form in a cache that is not within the same coherency domain as the LPC for the memory block, no update to the domain indicator in the LPC is required. Fourth, the castout of the Ig state is preferably performed as a dataless address-only operation in which the domain indicator is written back to the LPC (if local to the cache performing the castout).

Implementation of an Ig state improves communication efficiency by maintaining a cached domain indicator for a memory block in a coherency domain even when no valid copy of the memory block remains cached in the coherency domain. As a consequence, an HPC for a memory block can service an exclusive access request (e.g., a bus RWITM or bus DClaim operation) from a remote coherency domain without retrying the request and performing a push of the requested memory block to the LPC.

Figure 5:
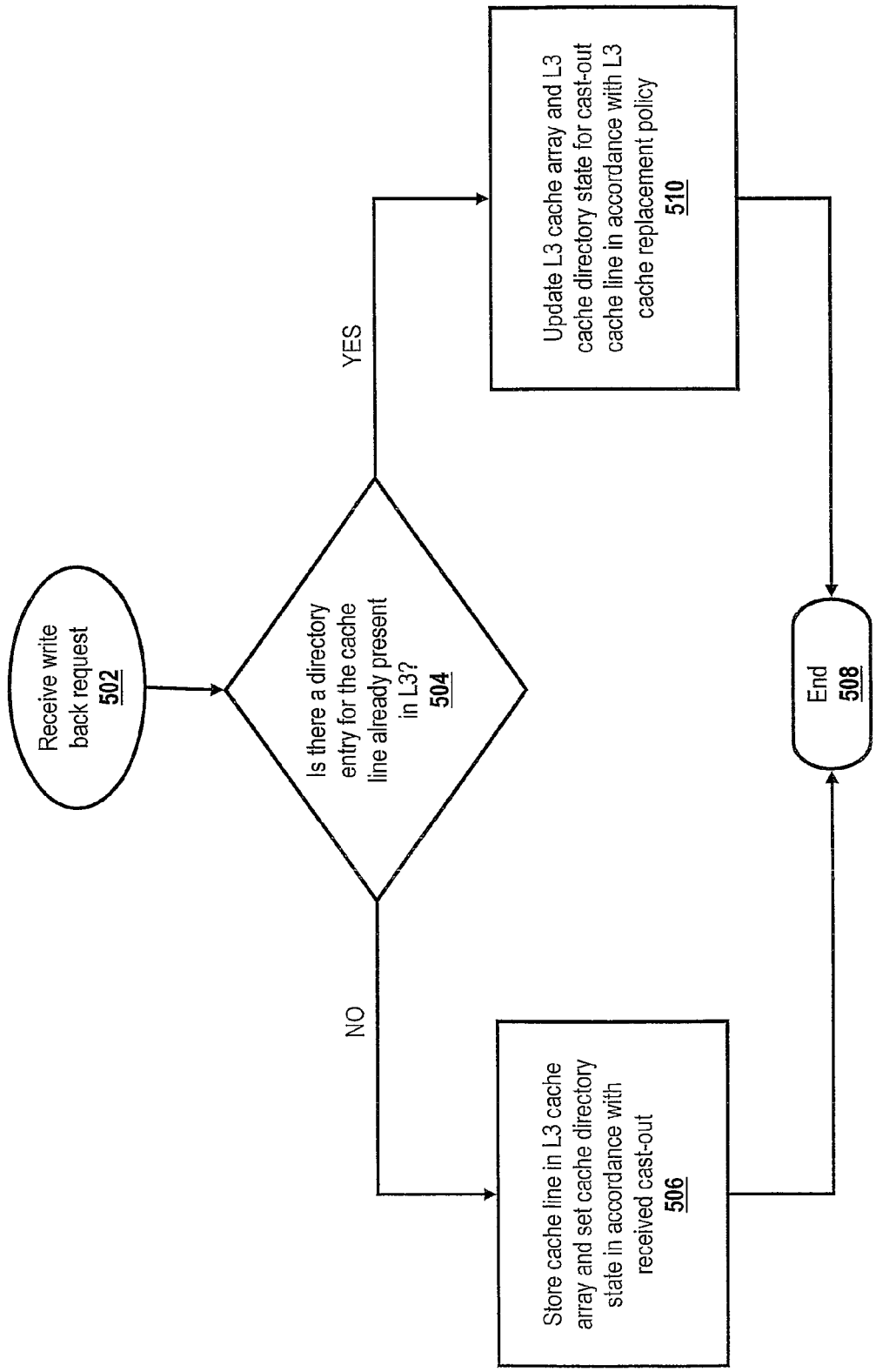
FIG. 5 is a high-level logical flow diagram of an exemplary method of performing cast-in to the L3 cache in accordance with the preferred embodiment of the present invention.

With reference now to FIG. 5, there is illustrated a high-level logical flow diagram of an exemplary method of performing cast-in to the L3 cache in accordance with the preferred embodiment of the present invention. The process depicted in FIG. 5 involves operations by the L3 cache controller 109. The process begins at step 502 when the L3 cache controller 109 receives a write back request from one of the L2 caches 230 within PU 104 as a result of a cache line being evicted from the L2 cache. Because L3 cache 105 is shared among all processing units 104 within processing node 102, a castout from any of those L2 caches 230 would be received as a write-back request at the L3 cache controller 109. The write-back request received will contain a cache directory state of the cache line being cast-in to the L3 cache. L3 cache controller 109 is programmed with a replacement policy to determine whether the cache line will be saved in the L3 cache array and the coherency state for the memory block in state field 306.

At step 504, cache controller 109 checks the L3 tag field 304 to determine if a directory entry is already present for the cast-in memory block. If the cache line address match is a miss in tag field 304, a victim is chosen within the L3 cache directory 302 and potentially is cast-out to memory, depending upon the victim's coherency state (e.g. Ig, Tx, Mx). As used herein, a class of Modified states is represented as a "Mx" variable, where Mx represents any one of M, Me, Mu. The four Tagged cache coherency states (i.e., T, Te, Ten, Tn) are represented as a "Tx" variable). The cache controller 109 stores the cache line in L3 cache array 300 and sets the state field 306 to the directory state received in the write-back request from the L2 cache 230. The process then proceeds to step 506 where L3 cache controller 109 stores the cache line in L3 cache array 300 and creates a corresponding cache directory entry within cache directory 302 as indicated by LRU field 308 by utilizing a least-recently used (LRU) or other replacement algorithm to store the cache line within its congruence class. L3 cache controller 109 also performs a cast-out of a victimized cache line from the L3 cache 105, if necessary. Thereafter, the process ends at step 508.

Returning to step 504, if there is a directory entry for the cast-in memory block within the L3 cache directory 302, the process proceeds to step 510, where the L3 cache controller 109 updates the L3 cache array and directory 302 with the cast-in cache line in accordance with a L3 cache replacement policy, as described below in accordance with the preferred embodiment of the present invention. As implemented in a preferred embodiment of the present invention, the L3 cache replacement policy specifies (1) whether the cast-in cache line is stored within the L3 cache array 300 or is discarded, and (2) the state in which the L3 cache directory state field 306 is set in response to the write back request. A detailed description of the L3 cache replacement policy is provided below in conjunction with the process illustrated in FIG. 6.

The cache coherency replacement policy of a preferred embodiment used by L3 cache 105 when performing a cast-in on a cache line currently present within the L3 cache is summarized in Table III below.

TABLE III

|  | L3 CurrentState | | | | | | |
|---|---|---|---|---|---|---|---|
| L3CI (state) | In | Ig | I | S | Sl | Tx | Mx |
| In | In | Ig | In | S | Sl | Tx | Mx |
| Ig | Ig | Ig | Ig | Ig | Ig | Tx | Mx |
| I | In | Ig | I | Sx | Sx | Tx | Mx |
| S | S | Ig | S | S | Sl | Tx | err |
| Sl | Sl | Ig | Sl | Sl | err | Tx | err |
| Tx→T, Te, Ten, Tn | Tx | Tx | Tx | Tx | Tx | err | err |
| Mx→M, Me, Mu | Mx | Mx | Mx | err | err | err | err |

Table III provides the L3 cast-in state transition for a cache line cast-in to the L3 cache when the memory block being castout from the L2 is already tagged in the L3. Table III identifies the resulting coherency state to be stored in state field 306 as a function of the cache line's current state within the L3 directory and the coherency state of the cache line in the L2 cache performing the castout. The top row of Table III indicates the current coherency directory state (L3 Current-State) as indicated in state field 306 for a cache line tagged within L3. The left column of Table III identifies the coherency state (L3CI (state)) of the cache line being cast-in to the L3 cache from L2 cache. The resulting coherency state overwrites state field 306 for the cache line upon being cast into L3 cache.

This cache coherency replacement policy further dictates whether the memory block stored within the L3 cache array 300 is to remain at its current value or is to be overwritten by the cast-in cache line value from the L2 cache. The overwrite policy is represented by each underlined resulting coherency state in Table III (e.g. Mx). If the resulting coherency state transition is underlined, the cast-in cache line is stored in L3 cache array 300. If the resulting coherency state is not underlined, the cache line remains unmodified within the L3 cache array 300 at its existing value (i.e., existing value is coherent), while the cache line's coherency state in field 306 is transitioned to the resulting coherency state identified in Table III.

An alternative view of the replacement policy defined by Table III is represented by the following Coherency State Transition Rule, which specifies when the coherency state currently held in L3 cache directory 302 is overwritten by a cast-in coherency state:

(Mx|Tx)→Ig→Sl→S→In→I

The Coherency State Transition Rule defines a hierarchy of coherency states, where Mx|Tx is at the highest level and each arrow indicates a next-lower level of coherency. This general rule specifies that if the cast-in coherency state is higher within this hierarchy than the current state in the L3 cache directory, the cast-in state will overwrite the current entry. Correspondingly, if the current state in the L3 directory is higher than the cast-in coherency state, the current state is not overwritten and is maintained in its current state.

With reference back to Table III, the bottom row of Table III indicates the cast-in coherency state of the cache line is a Modified (M) state (i.e. M, Me, Mu). This class of M states is represented as a "Mx" variable, where Mx represents any one of M, Me, Mu. The Tx row within Table III represents an L3 cast-in state of any of the four Tagged cache coherency states (i.e., T, Te, Ten, Tn).

As seen in Table III, if the L3 current state for the cache line hitting in the L3 is In, Ig, or I, the Mx state or Tx state of the L3 cast-in cache line will be stored in the state field 306 of the L3 cache directory 302 in place of the current state for the cast-in cache line. Further, because the cast-in cache line has been modified by one of the processing units 104, the cache line being cast out from the L2 cache array must be stored into the L3 cache array 300. This action is represented by an underline under each of the directory cache states (i.e., Mx) shown in the last two rows of Table III. Note that the last four columns of the Mx row and the last two columns of the Tx row indicate that an error (err) has occurred, since these are invalid concurrent states for the same cache line in both the L2 and L3 under the coherency protocol. For example, if the current state of the L3 cache indicates the cache line is shared (S), it is impossible for the L2 cache to be casting out the same cache line in a modified (M) state. Accordingly, the "S" column of Table III indicates an error within the Mx row.

Referring now to the "S" and "Sl" rows of Table III, if the L3 cast-in state is set to Sx (i.e., S or Sl) and the current state of the cache line in the L3 cache is either the In or I states, the shared state indicated by Sx should be set in the L3 cache, since the data and tag are valid within the L2 cache casting out the data. Also, as indicated by the underlined entries in Table III, the cache line is replaced with the cast-in data within the cache array 300. Here the data and tag are both valid being cast in from the L2 and so the state and data (as shown by the underline) are stored into the L3, since the L3 indicates the cache line is invalid. In contrast, if the L3 indicates Ig current state, the L2/L3 caches have performed modified intervention to an L2 outside the domain, and thus the data may be invalid. Consequently, the current state of the directory needs to remain Ig and the data is not stored to L3 cache. Although this may create inefficiencies in that the shared data being cast in from the L2 may potentially still be valid, the potential cache management issues outweigh the advantages of maintaining the state data. If both the cast-in and current states are both S, the current state remains S and the cache array is not updated. If the cast-in state is S and the current state is Sl or if the cast-in state is Sl and the current state is S, the cache coherency state is remains is replaced with Sl, which adds additional information to the shared state. Note that both the L2 and L3 caches cannot both contain a cache line in the Sl state, so if both the cast-in and current state are set to Sl, an error has occurred. If the L3 current state is Tx as shown in the Tx column, this information is always retained within the L3 cache upon a cast-in from an L2. This cache state indicates that the L3 cache is holding data and tag as valid and that the data has been modified.

With reference now to the "I" row of Table III, the current states within the L2 provide additional or the same information as the I state being cast in, and therefore no state is replaced in the L3 cache directory. With reference to the In, Ig and I rows of Table III, the L3 cache array 300 is never updated with a cast-in having the Ix state, as the cache line data is always invalid.

With reference now to the Ig row of Table III, the L3 current state of the cast-in cache line is replaced with the L3 cast-in state of Ig for each of the Ix and Sx L3 current coherency states. This follows because control of the cache line has been sent outside the domain, and therefore the invalid and/or shared state in the L3 is out-of-date. Conversely, when the L3's current state indicates it holds a modified version of the cache line, as indicated by the Tx or Mx states, the cast-in Ig state is discarded and the L3 current state remains unchanged.

With reference now to the In row in Table III, the only situation where the In cast-in coherency state is used to replace the current coherency state of the cache line in the L3 is when the current state in the L3 is shown as invalid (I). This is because the In state adds the additional imprecise indication that the L2/L3 cache either performed modified intervention to an L2 inside this domain or it detected a store-type operation by a master inside the domain. This state is a hint that the line is still in the domain. The remaining current states in the In row provide equal or additional information regarding the current state of the cache line in the domain, and are therefore maintained and not replaced by the cast-in state from the L2 cache.

Figure 6:
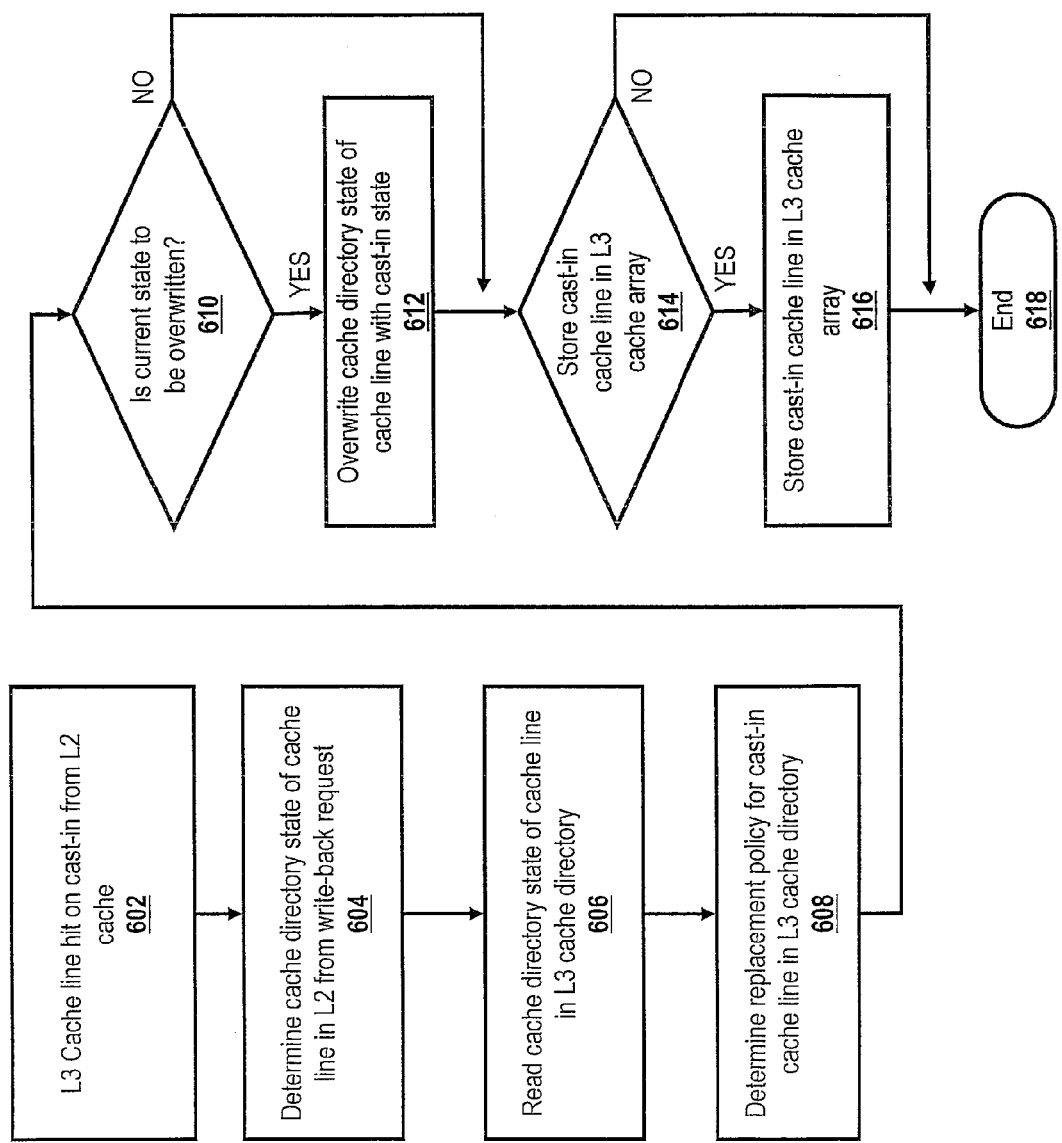
FIG. 6 is a high-level logical flow diagram of an exemplary method of a coherency state transition policy implemented by the L3 cache in response to a cast-in, in accordance with a preferred embodiment of the present invention.

With reference now to FIG. 6, there is illustrated a high-level logical flow diagram of an exemplary method of a coherency state transition policy implemented by the L3 cache in response to a cast-in, in accordance with a preferred embodiment of the present invention. The process for implementing the coherency state transition policy of the L3 cache begins at step 602 when a victim cache line address hits in the L3 cache directory 302 upon cast-in from the L2 cache 230. The process proceeds to step 604 where the L3 cache controller 109 determines the cache coherency state of the victim cache line in the L2 cache specified in the write-back request received from the L2 cache 230. At step 606, the L3 cache controller 109 reads the cache coherency state in state field 306 upon a cache line address hit in the L3 tag field 304. The process then proceeds to step 608 where the L3 cache controller 109 determines the coherency state transition policy for the cast-in cache line in the L3 cache directory 302. This determination is based on the policy specified by Table III and is implemented by L3 cache controller 109 by a look-up function into a state table implementing Table III in non-volatile memory accessible by the L3 cache controller 109, for example by read-only memory (ROM) within the L3 cache 105. In alternative embodiments, L3 cache controller 109 algorithmically implements the Coherency State Transition Rule specified above by software functionality, for example, or through other hardware circuitry implementation.

Thereafter, the process proceeds to step 610 where L3 cache controller 109 determines if the current coherency state for the victim cache line will be overwritten in the L3 cache directory 302 based on the replacement policy determined at step 608. If the current state is to be overwritten, the process proceeds to step 612, which represents cache controller 109 overwriting the cache coherency state of the cast-in cache line with the coherency state specified by the cast-in request. The process proceeds from step 612, or from step 610 if the current state is not to be overwritten, to decision block 614, where cache controller 109 determines if the cast-in cache line received from the L2 cache 230 shall be stored in the L3 cache array 300. If the replacement policy determined at step 608 specifies that the cast-in cache line should be stored in the L3, the process proceeds to step 616 where cache controller 109 stores the cast-in cache line in the L3 cache array 300, thereby overwriting the previously stored cache line data for the cast-in cache line address. Following step 616, or step 614 if the L3 cache array is not to store the cast-in cache line, the process ends at step 618.

While the invention has been particularly shown and described with reference to a preferred embodiment, it will be understood by those skilled in the art that various changes in form and detail may be made therein without departing from the spirit and scope of the invention. For example, the present invention may be implemented using any combination of computer programming software, firmware or hardware.

What is claimed is:

1. A cache coherent data processing system, comprising:
a plurality of processing units each having at least an associated upper cache memory;
a lower cache memory associated with the plurality of processing units, wherein the lower cache memory includes:
a plurality of storage locations for storing a memory block of data, wherein each of the plurality of storage locations is sized to store a sub-block of data;
metadata storage for storing metadata describing the memory block; and
a memory controller that is coupled to and controls access to the lower cache memory, wherein the memory controller overwrites at least a portion of metadata in the metadata storage associated with a particular sub-block of data with a coherency state determined as a function of: (1) first coherency metadata related to the particular sub-block of data indicated in the metadata storage, and (2) second coherency metadata related to the particular sub-block of data indicated in the upper cache memory, wherein the memory controller determines a relative priority of the first coherency metadata and the second coherency metadata, wherein the relative priority between coherency metadata is defined as: (Mx|Tx) <<Ig<<Sl<<S<<In<<I, wherein all coherency metadata to the left of a coherency metadata has priority over that coherency metadata.

2. The system of claim 1, wherein the memory controller overwrites in response to a request to store the particular sub-block of data from an upper cache memory.

3. The system of claim 1, wherein the memory controller overwrites the portion as a function of the first coherency metadata related to the particular sub-block of data indicated in the metadata storage only if such first coherency metadata is contained in the metadata storage.

4. The system of claim 1, wherein the memory controller is capable of accessing a coherency state table indicating the coherency state.

5. The system of claim 1, wherein the coherency state is equal to the second coherency metadata when the second coherency metadata indicates the particular sub-block of data is modified.

6. The system of claim 1, wherein the coherency state is equal to the first coherency metadata when the first coherency metadata indicates the particular sub-block of data is modified in the lower cache memory.

7. The system of claim 1, wherein the coherency state is equal to the second coherency metadata when the second coherency metadata indicates the particular sub-block of data is shared and the first coherency metadata does not indicate the particular sub-block of data is modified in the lower cache memory.

8. The system of claim 1, wherein the memory controller stores the particular sub-block of data in a storage location of the lower cache memory only when the second coherency metadata indicates the particular sub-block of data is modified.

* * * * *